UNITED STATES PATENT OFFICE.

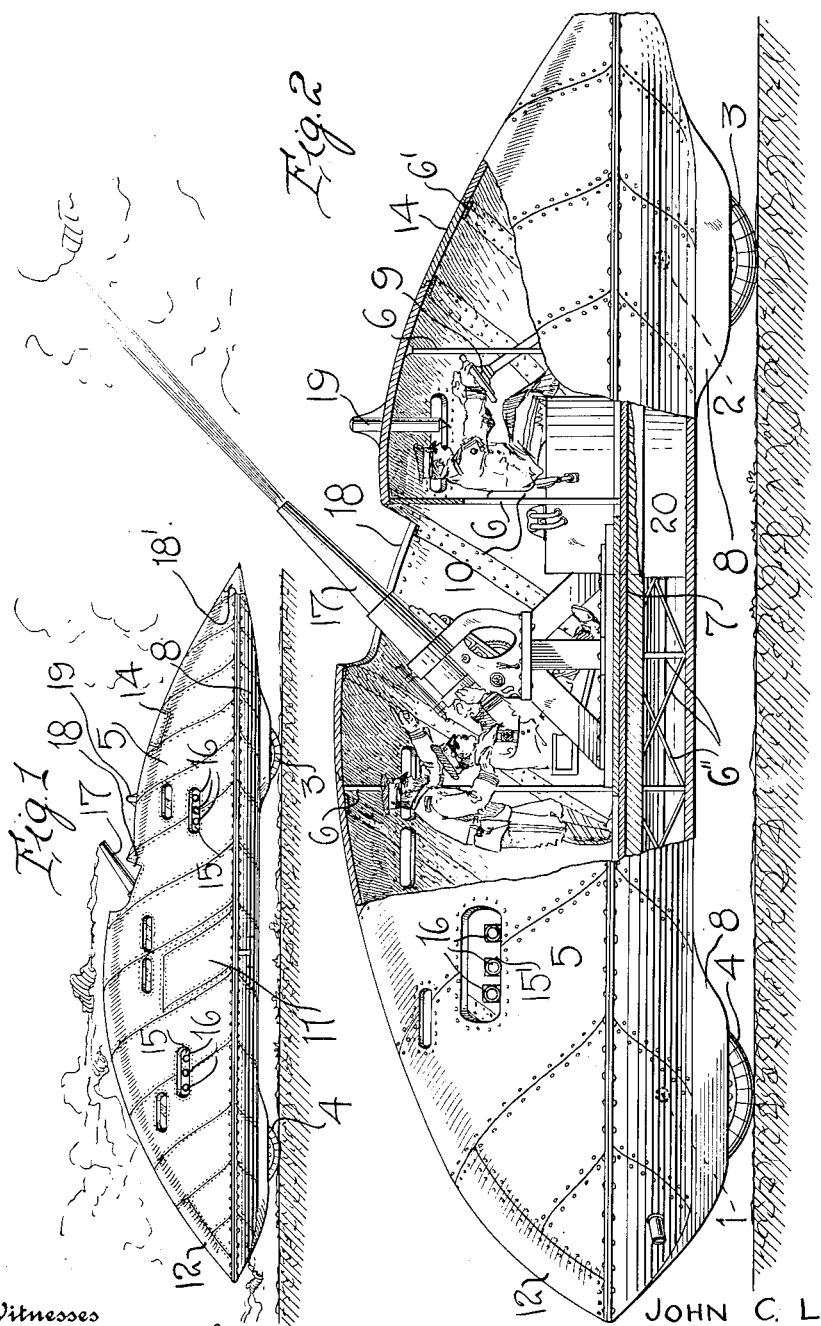

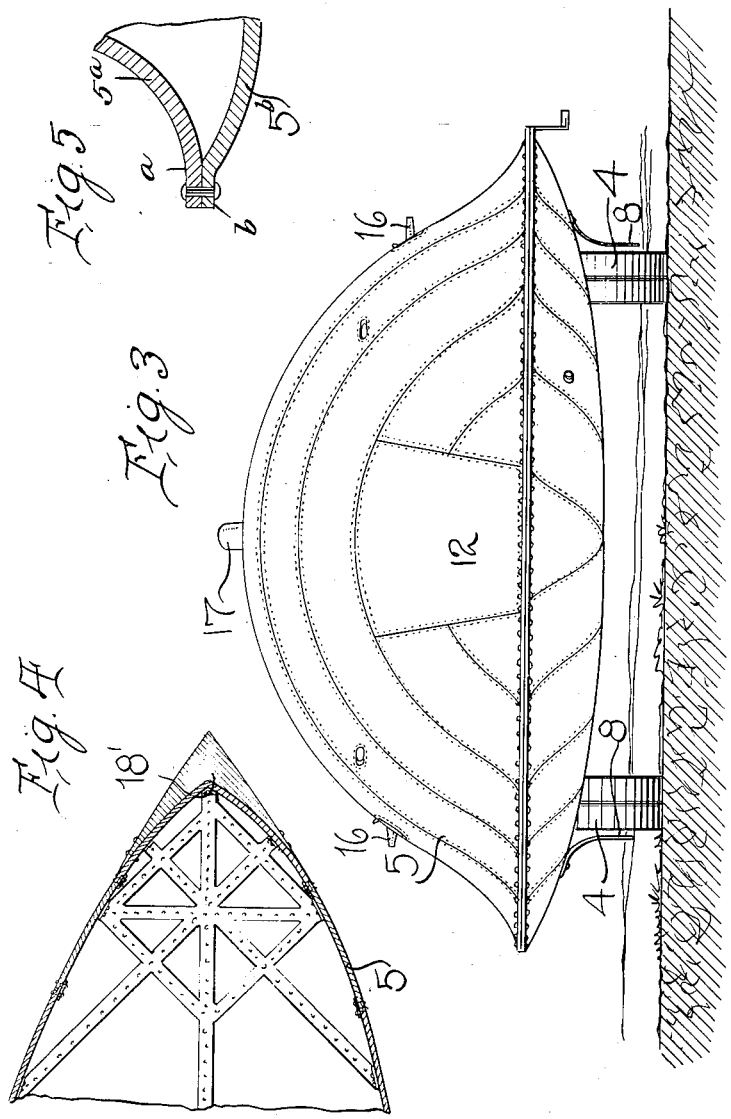

JOHN C. LOBATO, OF LOWELL, MASSACHUSETTS.

MOTOR-VEHICLE.

1,136,605. Specification of Letters Patent. Patented Apr. 20, 1915.

Application filed November 21, 1914. Serial No. 873,340.

*To all whom it may concern:*

Be it known that I, JOHN C. LOBATO, a citizen of Portugal, residing at Lowell, in the county of Middlesex and State of Massachusetts, have invented certain new and useful Improvements in Motor-Vehicles, of which the following is a specification, reference being had to the accompanying drawings.

This invention relates to new and useful improvements in motor vehicles and more particularly to the construction of a motor vehicle, which is adapted for use upon battle fields, the main object of the present invention being the provision of an automobile which can be used for carrying machine guns and is so constructed that it can be readily changed into an ambulance or can be used for reporter transportation on the battle field.

Another object of the present invention is the provision of a motor vehicle of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of a motor vehicle constructed in accordance with my invention. Fig. 2 is a similar enlarged view, parts thereof being broken away and illustrated in cross section. Fig. 3 is a rear elevation. Fig. 4 is a longitudinal sectional view of the front portion thereof, illustrating the bracing means; and Fig. 5 is a detail transverse sectional view illustrating the connection between the upper and lower sections of the body.

In the construction of my improved vehicle, it will be understood that the chassis may be of any well known make and is to be mounted upon the axles 1 and 2, said axles having the wheels 3 and 4 mounted upon the ends thereof, the wheels 3 being the front or steering wheels and the wheels 4 the rear or driving wheels. The body of my improved vehicle, which is generally indicated by the numeral 5 is formed of sheet metal securely held in position by means of bracing rods 6.

The body 5 is formed of an upper portion 5ª and of a lower portion 5ᵇ, the lower portion being shallow relative to the upper portion. The body 5 is approximately elliptical in plan and the top portion is longitudinally upwardly bowed or curved and is, generally speaking, transversely upwardly bowed or curved. Thus no portion of the body presents a flat surface. As before stated, the bottom portion 5ᵇ is transversely curved and also longitudinally curved and is relatively shallow. As illustrated in Fig. 5, the upper portion 5ª of the body adjacent its margin is reversely curved to the portion above the margin so as to extend downward and outward and so that the edge *a* of the margin extends practically in a horizontal plane. The bottom portion 5ᵇ at its margin is outwardly turned as at *b* approximately in a horizontal plane, and these two portions are riveted or otherwise connected to each other. There is thus provided around the entire machine a marginal belt, or band as it may be termed, of metal, which extends horizontally and which is of double thickness, this band, therefore, being so constructed as to offer a maximum of resistance to shock, either the shock caused by the impact of a projectile, or the shock incident to the machine striking an obstacle. Furthermore, as this protecting band or reinforced portion is longitudinally curved, the object which is impacted against the band will tend to glide off, or the machine will tend to glance off and the blow thus delivered will be a glancing blow.

It is to be noted that if the portion 5ª is extended downward to its margin in the same curve that the upper part of the portion 5ª has, it would meet the portion 5ᵇ at an angle and would form no such shock resisting band as is formed by the construction illustrated in Fig. 5, and therefore that the armor of the car would be weak and offer only a minimum amount of resistance at the very place in the armor which should offer the maximum resistance. Furthermore, it will be seen that in this last case at all portions except the sides a projectile striking the car would tend to glance off because of the fact that the surface contour of the armor is rounded in every direction, and therefore the side of the car would be the most vulnerable point. With my construction, however, that part of the car which is most liable to be struck by projectiles and from which projectiles will ordinarily have the least tendency to glance off is so formed by making the reverse curve at the margin of the upper portion of the armor, so that a projectile striking this part will tend to glance upward or be deflected upward from an approximately horizontal course and thus do no damage. It will further be seen that the thickened portion or belt is not only strengthened by the fact that it is formed of two thicknesses disposed in a nearly horizontal plane, and that it is further reinforced in that the upper and lower sections of the armor are disposed adjacent each other at a relatively acute angle. It will be noted that the body 5 is formed of a plurality of sheet metal strips, the upper portion of the body having the strips extending substantially spirally and having their ends secured to the ends of the strips which form the bottom portion of the body. The different strips which constitute the bottom chamber and body of the vehicle, are securely fastened together by rivets, connecting strips 6' being arranged upon the inner sides of the strips at the inner sections thereof, whereby to securely fasten the edges of the strips together. Extending downwardly from the lower portion of the vehicle are the protecting strips 8 which are arranged upon the outer sides of the wheels to form a protection therefor.

Connected with the front axle 1, is a steering wheel 9 which can be readily operated from the driver's seat 10 to steer the vehicle in various directions. One side of the body 5 is provided with an opening which is normally closed by means of a door 11 whereby a person may enter the car or the occupants thereof may readily leave. A second door 12 is arranged at the rear of the vehicle to provide an entrance for persons desiring to enter the interior of the body from the rear thereof. This door is preferably provided so that should the vehicle be close to the firing line, a person may enter the same from the rear, without exposing themselves to the enemy's fire. The body 5 is provided upon the sides thereof and at various intervals with suitable openings 15 which will be known as watch openings, while the opening 14 formed in the front of the vehicle is provided for the use of the driver. Arranged adjacent the opening 14 is a periscope 19 which is used by the driver so that he can readily steer the vehicle wherever desired.

Formed in the side of the body at opposite points, are the openings 15' through which the muzzles 16 of any form of gun are to extend and arranged within the center of the body 5, is a heavier machine gun generally indicated by the numeral 17, the muzzle of which extends up through an enlarged opening 18 in the top of the body 5.

In the construction of my improved motor vehicle, the engine is located directly beneath the driver's seat. It will be understood that by removing the guns and other equipment within the device, the same can be readily used for transporting the wounded from the battle field to the hospital and can also be used for conveying reporters, and other persons desiring to obtain a vantage point at the front of the firing line, so that they will not be exposed to the danger of the enemy's fire. Should it be desired to use this machine upon a battle field, where close range firing is going on, the vehicle can be used, provided the surface permits, for charging the enemy, as the forward end of the machine is provided with a penetrating point formed by a heavy steel ram or prow 18' arranged over the outer end of the same and rigidly secured in any desired manner. The cap 18' is preferably formed of heavy steel but it will be understood that the same may be made of any material desired. It will be noted also that this ram 18' forms a cap covering the forward pointer end of the body and being disposed in the same plane as the reinforced or thickened portion or belt formed by the meeting edges of the upper and lower sections of the armor, so that the shock due to the impact of the ram against the body will be transmitted principally to this reinforced or thickened marginal portion. The tires upon my improved vehicle are preferably solid rubber and, in the accompanying drawings, it will be noticed that they are formed in sections to provide for a suitable gripping surface.

Arranged between the bottom of the body and the lower portion of the sheathing, are a number of brace rods or braces 6" which support the lower portion of the sheathing in spaced relation with the bottom and it will be noted that the front part of the vehicle, as illustrated in Fig. 4, is provided with numerous integral braces so that should the front end of the vehicle strike a stationary or exceptionally heavy object, it will not crush the end of the body. The main body of the vehicle upon the inner side thereof is preferably lined with cork or other material of this character, so that should the same be driven over unusually rough surfaces, and the persons within the same be shaken about, they will not be injured by striking the inner walls of the body and also for the purpose of deadening the sound caused by the impact of a projectile upon the armor.

From the above description, it will be apparent that I have provided a simple and durable vehicle wherein the body is formed of strips of metal arranged spirally to form a deflecting surface for bullets and other articles and, at the same time, the device is provided at its forward end with a penetrating point, the purpose of which has been hereinbefore set forth. The device in itself is extremely simple in construction, consists of comparatively few parts and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

Having thus described this invention, what I claim is:—

1. An armored car including a wheeled truck portion, and a hollow metallic body inclosing the truck and having openings for the projection of the wheels, said body being elliptical in plan and upwardly bowed or rounded from end to end and transversely bowed or rounded from lateral edge to lateral edge.

2. An armored car comprising a wheeled truck, and a hollow metallic body inclosing said truck, said body having a transversely and longitudinally downwardly curved or bowed bottom section having openings for the projection of the wheels of the truck and a transversely and longitudinally upwardly bowed or curved upper section connected at its margin to the margin of the lower section, the body being elliptical in plan.

3. An armored car including a hollow metallic body formed of an upper section and a lower or bottom section, both of said sections being longitudinally bowed in opposite directions and transversely bowed in opposite directions, the lateral margins of the top and bottom sections being respectively curved downward and upward and then gradually reversely curved outward and connected to each other whereby to provide a reinforced belt around the car composed of two thicknesses of material extending approximately in a horizontal plane.

4. An armored car including a wheeled truck portion, and a hollow metallic body formed of an upper section and a bottom section, the bottom section being relatively shallow and transversely and longitudinally bowed or curved and formed with openings for the projection of the wheels, the top section being transversely and longitudinally curved, the margin of the bottom section being joined to the margin of the top section to provide a relatively stiff and rigid reinforced impact receiving band extending entirely around the body and projecting beyond any other portion thereof.

5. An armored car including a wheeled truck portion, and a hollow metallic body inclosing the truck portion, said body being elliptical in plan and having a top portion upwardly bowed or curved from end to end, and transversely bowed or curved, and a longitudinally and transversely curved bottom portion, said body being formed to provide an impact receiving belt or band of reinforced material extending entirely around the body in a horizontal plane and projecting beyond any other portion of the body.

6. An armored car including a wheeled truck portion, a hollow metallic body inclosing the truck portion, said body being elliptical in plan and having a top portion upwardly bowed or curved from end to end, and transversely bowed or curved, and a longitudinally and transversely curved bottom portion formed to provide an impact receiving belt or band of reinforced material extending entirely around the body in a horizontal plane and projecting beyond any other portion of the body, and a pointed ram disposed at the forward end of the body and on a line with said reinforced belt or band, whereby shocks communicated to the ram will be distributed along said reinforced portion.

In testimony whereof I hereunto affix my signature in the presence of two witnesses.

JOHN C. LOBATO.

Witnesses:
　JOHN OLIVER SMALL,
　FRANCIS J. MURPHY.